United States Patent [19]

Lake

[11] Patent Number: 5,222,695
[45] Date of Patent: Jun. 29, 1993

[54] EJECTION SEAT SEQUENCER

[75] Inventor: Geoffrey R. Lake, Longwick, Nr. Princes Risboro, Great Britain

[73] Assignee: Martin-Baker Aircraft Company Limited, Middlesex, United Kingdom

[21] Appl. No.: 775,693

[22] Filed: Oct. 10, 1991

[30] Foreign Application Priority Data

Oct. 11, 1990 [GB] United Kingdom ............... 9022095

[51] Int. Cl.<sup>5</sup> .......................................... B64D 17/58
[52] U.S. Cl. ........................................... 244/122 AE
[58] Field of Search ................................ 244/122 AE

[56] References Cited

U.S. PATENT DOCUMENTS

| | | | |
|---|---|---|---|
| 4,057,206 | 11/1977 | Duncan et al. ............. | 244/127 AE |
| 4,527,758 | 7/1985 | Ayoub et al. ............... | 244/122 AE |
| 4,580,746 | 4/1986 | Peck ........................... | 244/122 AE |
| 4,673,147 | 6/1987 | Solomonides . | |
| 4,721,273 | 1/1988 | Trikha . | |
| 4,792,903 | 12/1988 | Peck et al. ................... | 244/122 AE |
| 4,846,421 | 7/1989 | Trikha ......................... | 244/122 AE |

FOREIGN PATENT DOCUMENTS 0085841 8/1983 European Pat. Off. .
0354276 2/1990 European Pat. Off. .

OTHER PUBLICATIONS

IEEE 1988 Naecon Proceedings, May 23–27, vol. 3, pp. 874–880 S. Hellyer & C. Sherhod, "Electronics on the Ejection Seat".

*Primary Examiner*—Galen Barefoot
*Attorney, Agent, or Firm*—Collard & Roe

[57] ABSTRACT

An electronic sequencer for an aircraft ejection seat comprising a plurality of sensors for air-speed, temperature, air pressure and acceleration. These sensors provide, via interface circuitry, signals in digital electronic form to a microprocessor which, when appropriate, initiates various functions of the ejection seat, such as the deployment of drogue and main parachutes and release of seat harness. The sensors and main components of the microprocessor are provided in triplicate and the microprocessor uses a polling procedure to obtain a high level of reliability of operation.

5 Claims, 6 Drawing Sheets

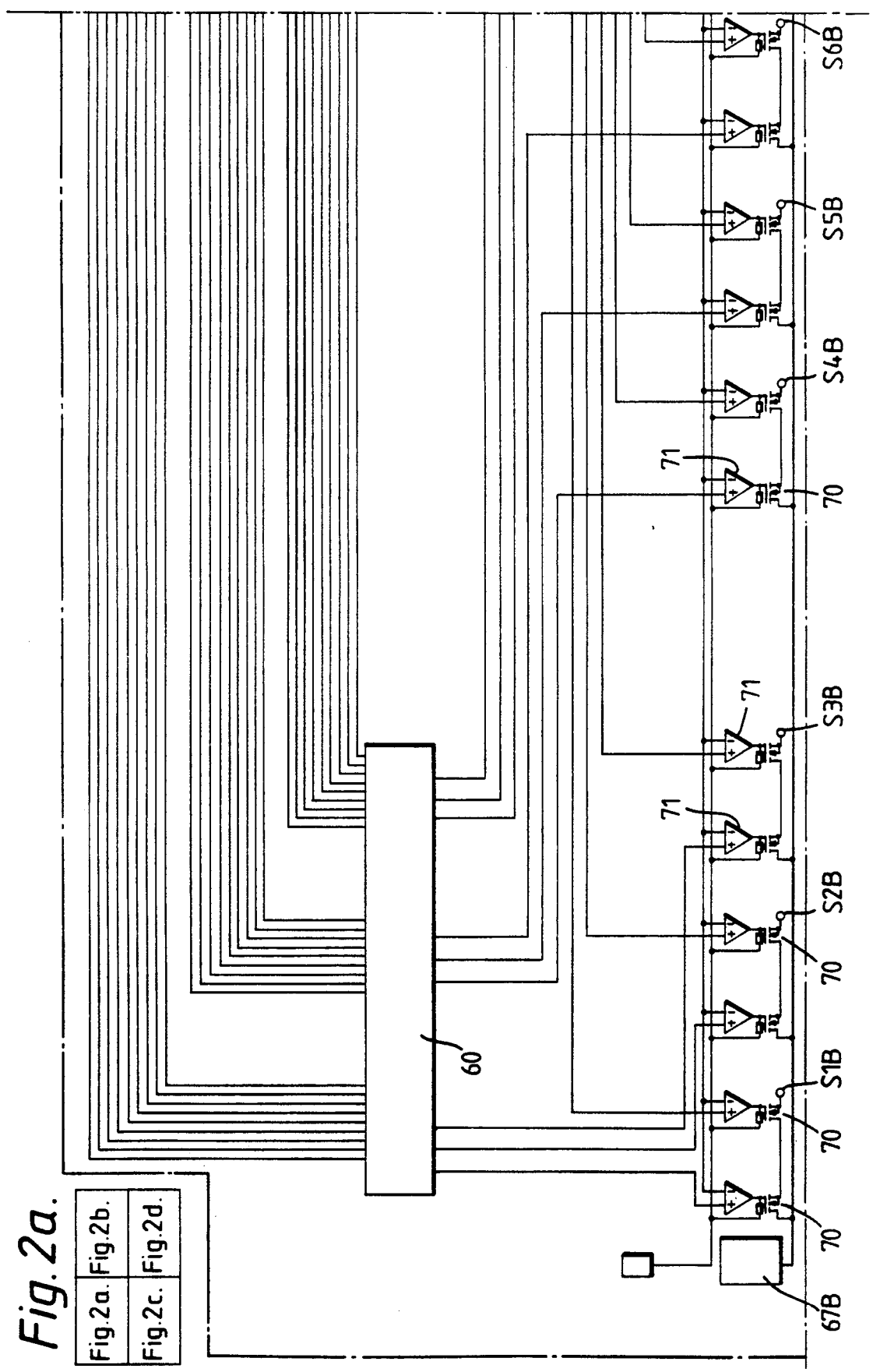

EJECTION SEAT SEQUENCER

This invention relates to a sequencer for an aircraft ejection seat, that is to say a controlling device which controls the sequence in which particular events in the functioning of such a seat take place in accordance with the conditions under which ejection occurs. Typical events in such a sequence include the deployment of a drogue chute, the deployment of a main chute and the release of the seat proper from the airman after the latter has become fully supported by the main chute. The desired sequence and timing of such events varies in accordance with the conditions under which ejection occurs. Thus, for example, where ejection occurs at high altitude, it is desirable to wait until the seat, with the airman, has reached a lower altitude, where the air is dense enough to be breathed and where temperatures are not excessively low, before deployment of the main chute, since excessive delay in the airman reaching such a lower altitude may result in frostbite and/or oxygen starvation. Conversely, if ejection occurs at low altitude, it is clearly desirable that the main chute should be deployed as soon as possible, consistent with the air speed of the airman and seat, at the time of such deployment, being sufficiently low to avoid damage to the main chute and/or injury to the airman.

It is known to provide control means, adaptable to such varying conditions, and which are primarily mechanical in construction and operation and such mechanical sequencing arrangements have, indeed, reached a high level of sophistication and reliability.

However, such mechanical systems are expensive to manufacture and are relatively heavy and bulky.

It is an object of the present invention to provide an electronic sequencing arrangement for an aircraft ejection seat which can be manufactured more cheaply than the know mechanical arrangements, is more compact and less bulky than such known arrangements and which can, in addition, have improved reliability over such mechanical arrangements.

According to the invention there is provided electronic sequencing means for an aircraft ejection seat comprising a plurality of sensors for air-speed and/or temperature, and/or pressure, and/or acceleration, said sensors being arranged to provide output signals in electrical form, digital electronic processing means, means for presenting the signals from said sensors in digital electronic form to said processing means and means controlled by signals from said processing means, for initiating respective functions in relation to said ejection seat, such as the deployment of parachutes, release of seat harness or the like, said processing means incorporating program means whereby the timing and sequence of initiation of such functions is determined by said processing means in accordance with the signals from said sensors.

DESCRIPTION OF THE PREFERRED EMBODIMENT

Figure 1A:
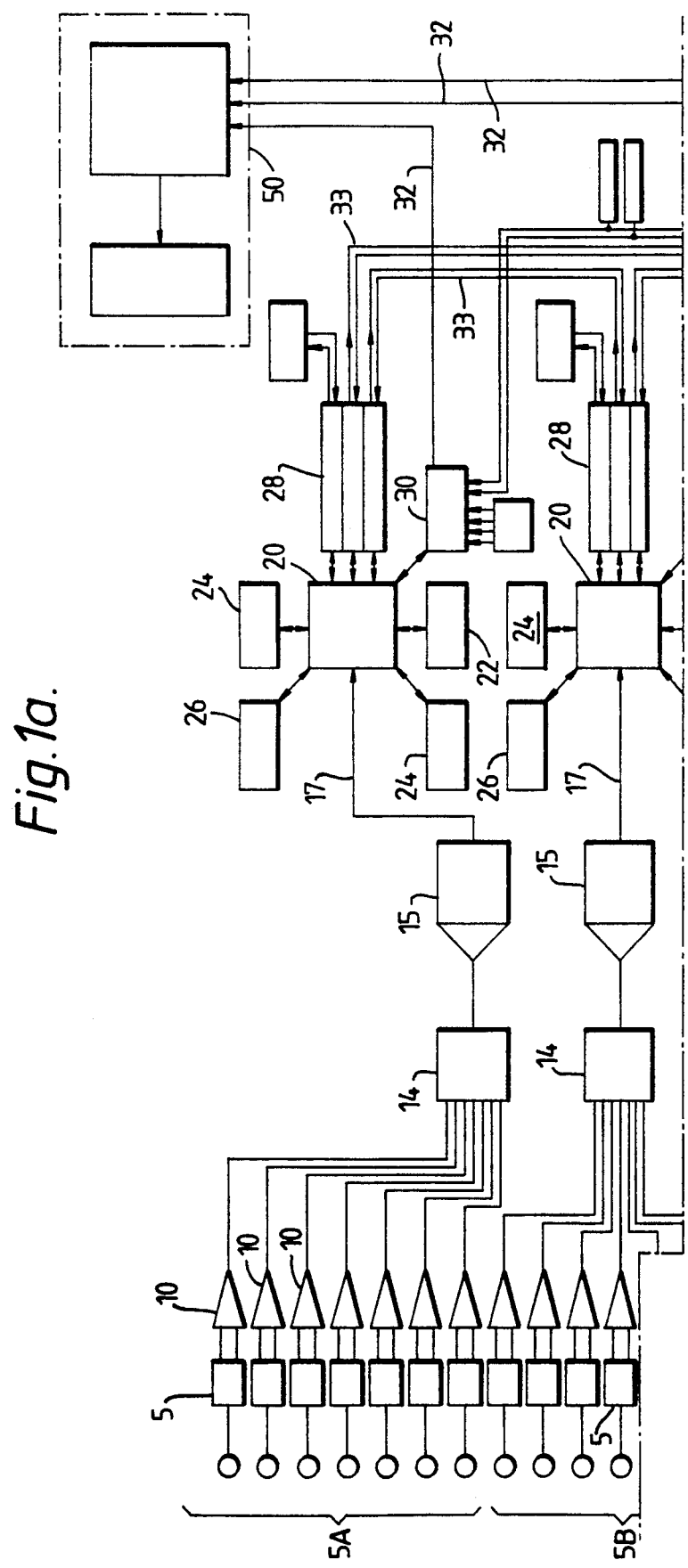
FIG. 1 is a schematic diagram illustrating respective parts of an electronic sequencer embodying the invention.

Referring to FIGS. 1 and 2a-2d of the accompanying drawings, the ejection seat (not shown) comprises three sets of sensors, 5A, 5B, 5C each set comprising seven sensors 5, with each sensor in each set performing the same function as a corresponding sensor in each of the other two sets so that each sensor is triplicated. Each set of sensors may include a pressure sensor for barometric pressure, serving as an altimeter, a temperature sensor, further pressure sensors associated with respective pitots for sensing air speed and sensors for sensing acceleration or deceleration along each of three mutually perpendicular axes, and a temperature sensor for software temperature compensation of pressure sensors and accelerometers. Each sensor is connected with respective amplifying, etc. circuitry, herein referred to as signal conditioning circuitry and indicated at 10 in the drawing, each circuit 10 providing a respective analogue output to a respective input of a multiplexer 14, having an output connected to a respective circuit 15 comprising, in combination, an analogue to digital converter and a sample and hold device. Each circuit 15 provides, for example on a 16-way parallel input bus 17, an input to a respective 16 bit central processor unit 20 having a non-volatile program memory 22, RAM 24, timers 26, a serial input/output facility 28 and a parallel input/output facility 30. Each microprocessor so constituted repeatedly monitors the outputs from the respective set of sensors and, in accordance with the program stored in the respective non-volatile memory 22 and the respective inputs applied thereto via the serial and parallel ports 28, 30, makes decisions as to whether and when particular steps in the operational sequence of the ejection seat should be initiated, such decisions being embodied in coded commands carried on 9-way outputs from the parallel ports to circuitry indicated at 50, each of said outputs being represented by a respective line 32 in FIG. 1. The circuitry 50 is arranged, in effect, to implement commands from the three microprocessors only when at least two out of these three commands correspond. Thus, the circuitry 50 effectively polls the microprocessors and operates the ejection seat mechanisms in accordance with the result of the poll. Also, software voting takes place between processors 20 via dual redundant serial links 33. The various mechanisms of the seat are initiated in known manner, by pyrotechnic devices or squibs, which, when initiated, produce, over a limited period, high pressure combustion gases for operating the respective mechanisms. These squibs are initiated electrically by the output from the circuitry 50 which is illustrated in more detail in FIGS. 2a-2d.

The circuitry of FIGS. 2a-2d comprises four blocks 60 of decoding circuits, each block comprising three micro-circuits, each micro-circuit having a respective set of input terminals, each set being connected with respective conductors of a respective one of the three output buses 32 from the microprocessor output ports. Each circuit 60, in accordance with the "polling" rationale noted above, is arranged to supply signals to respective sets of output devices which in turn are capable of providing electrical initiation of the respective squibs referenced S1 to S9 in FIGS. 2a-2d. The squibs, or the initiators therefor are each duplicated, for the sake of reliability, so that in "normal" operation of the apparatus if, for example, all three microprocessors agree on an action to be initiated, which involves the firing of the squib referenced S2A, not only will that squib be fired but also the squib S2B duplicated therewith.

Each squib S1 to S9 is arranged, in known manner, to be fired by passing electrical current therethrough from one terminal thereof to another. One such terminal (not shown) of each squib is connected to earth whilst the other terminal of each squib is connected to the source of a respective FET 70 having its drain connected to the source of a respective further FET 70 having its drain connected to a supply rail 65 so that each squib is connected, in series with a respective pair of FETs 70, between the power supply rail and earth. For enhanced reliability separate power supplies 67A and 67B are provided for the squibs with suffix A and for the squibs with suffix B. Each FET 70 has its gate connected to the output of a respective buffer amplifier 71 having its input connected to a respective output of a decoder device 60. For increased reliability of operation, the buffers of the respective pair of FETs connected with any of the squibs S1A, S2A, ... S1B, S2B ... have their inputs connected to respective outputs of different decoder devices 60.

Consequently, in the event of an inconsistency between the outputs of the devices 60 serving a squib in the bank of squibs S1A, S2A ... etc., for example, that squib will not be fired, although the parallel squib in the other bank may, (assuming that there is no such inconsistency in the outputs from the decoder devices 60 serving that other bank).

In addition to following the decision-making routine set out above, the program followed by each microprocessor may include subroutines adapted to compensate for inaccuracies or drift in the sensor outputs with changing physical conditions, such as temperature, pressure, acceleration along particular axes and so on.

Thus, for example, the pressure sensors may be of the solid-state semiconductor type, which are markedly temperature dependent, and the microprocessors may be arranged effectively to apply corrections to signals from the pressure sensors in accordance with signals from the temperature sensors, utilising a look-up table in memory, in a manner known per se.

I claim:

1. An electronic sequencer for an aircraft ejection seat, comprising:
   three identical sets of sensors, each set having a sensor selected from the group consisting of an air-speed sensor, a temperature sensor, an air pressure sensor, and an acceleration sensor, said sensors generating electrical output signals;
   digital electronic processing means including three microprocessors, each coupled to one set of sensors;
   means for presenting the signals from said sets of sensors to said digital electronic processing means in digital electronic form;
   means for initiating ejection seat functions including deployment of parachutes and release of a seat harness, controlled by signals received from said digital electronic processing means;
   program means incorporated into said digital electronic processing means whereby the timing and sequence of ejection seat functions is determined by said processing means and the signals received from said sets of sensors;
   wherein said digital electronic processing means conducting a polling procedure if conflicting signals are provided by said microprocessors; and
   wherein said means for initiating operates if at least two microprocessors provide the appropriate signal, said means for initiating including two sets of electrically operable squibs, each ejection seat function being assigned a pair of squibs, one squib from each set; and two similar control circuits each controlling one of said sets of squibs, each control circuit receives output signals from and independently polls said three microprocessors so that the sequencer still operates even if one circuit or one set of squibs fails; and means activatable by firing one or both squibs of said pair.

2. The electronic sequencer for an aircraft ejection seat according to claim 1, wherein each of said two control circuits including two circuit blocks, each having parallel inputs for receiving signals from said three microprocessors, wherein each squib includes a firing circuit requiring output signals from both circuit blocks within a circuit to fire.

3. The electronic sequencer for an aircraft ejection seat according to claim 2, additionally including a current source and two FETs and two buffer amplifiers per squib, each squib having two electrical terminals and being fired by passing a predetermined electric current through said terminals, one of said terminals being connected to ground, wherein a drain of said first FET is coupled to said current source and a source of said first FET is coupled to a drain of said second FET, said first buffer amplifier being coupled between an output of one circuit block and a gate of said first FET, said second buffer amplifier being coupled between an output of the other circuit block and a gate of said second FET, and a source of said second FET being coupled to the other terminal of said squib.

4. An electronic sequencer for an aircraft ejection seat, comprising:
   three identical sets of sensors, each set having a sensor for air-speed, temperature, air pressure and acceleration;
   three microprocessors, one for each of said sets of sensors, each having an input bus, ROM storing a program for the microprocessor, RAM, a port, and an output bus;
   analog-to-digital conversion means and multiplexing means for each set of sensors for transmitting data representing the quantities sensed by each set of sensors to one of said microprocessors via said input bus;
   means for initiating ejection seat functions including deployment of parachutes and release of a seat harness, said microprocessors as controlled by said program determining the timing and sequence of ejection seat functions by applying signals via said ports and said output buses to said means for initiating, wherein said means for initiating conducting a polling procedure if conflicting signals are provided by said microprocessors, wherein said means for initiating operates if at least two microprocessors provide the appropriate signal.

5. The electronic sequencer for an aircraft ejection seat according to claim 4, wherein said microprocessors are in communication with each other through said ports and software polling occurring between microprocessors as controlled by said program.

* * * * *

UNITED STATES PATENT AND TRADEMARK OFFICE
CERTIFICATE OF CORRECTION

PATENT NO. : 5,222,695
DATED : June 29, 1993
INVENTOR(S) : Geoffrey R. Lake

Figure 1B:
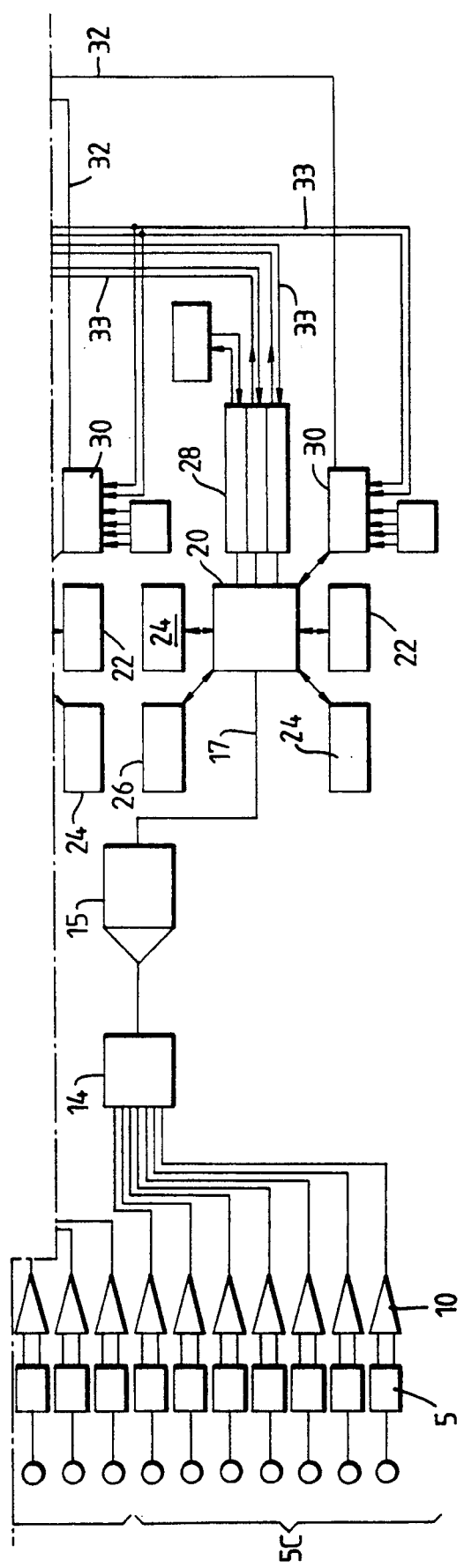
Figure 2B:
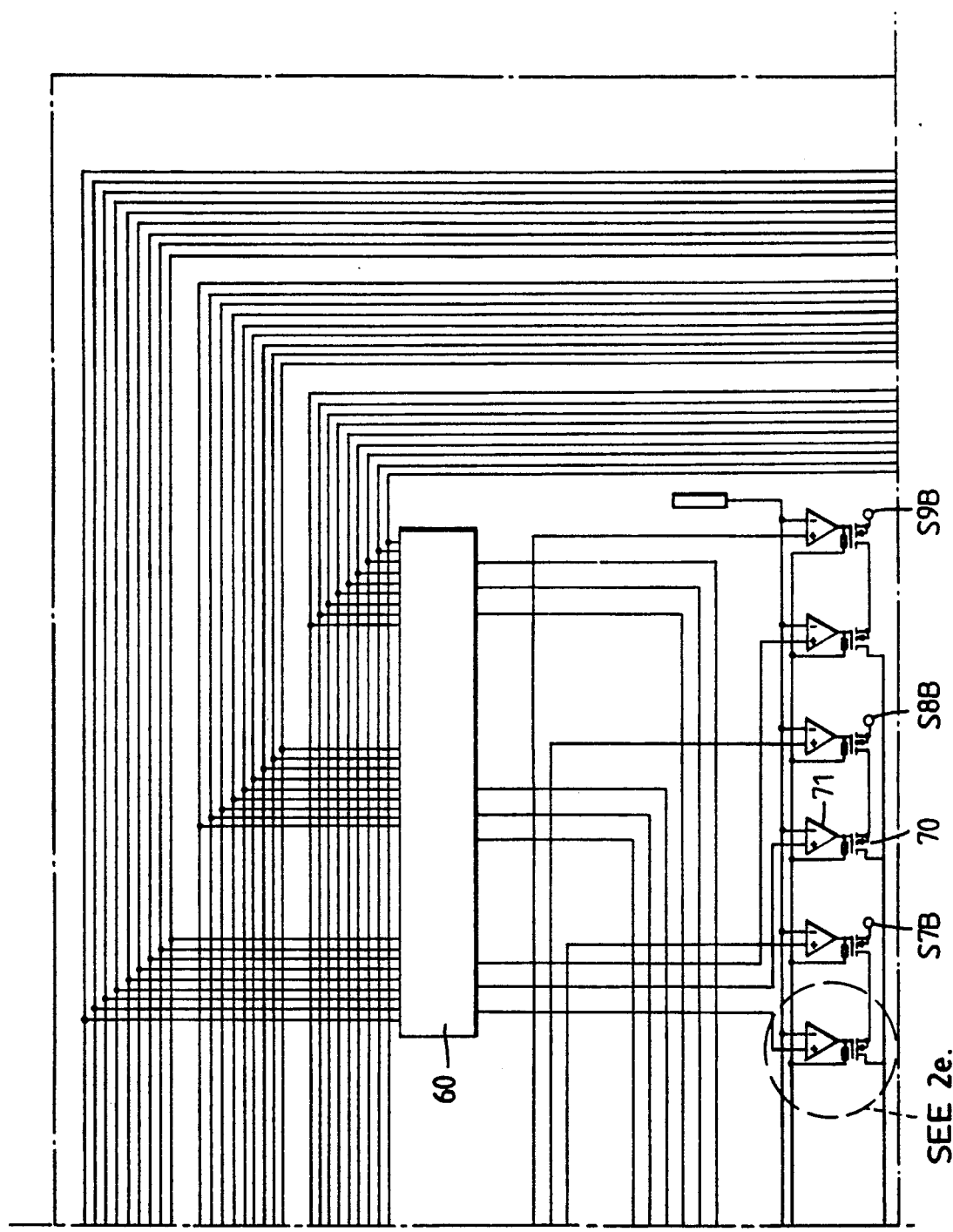
FIGS 2a-2d show the squibs and related circuitry.
Figure 2E:
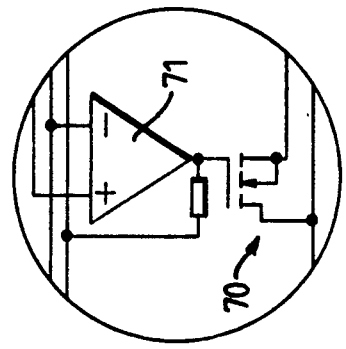
Figure 2C:
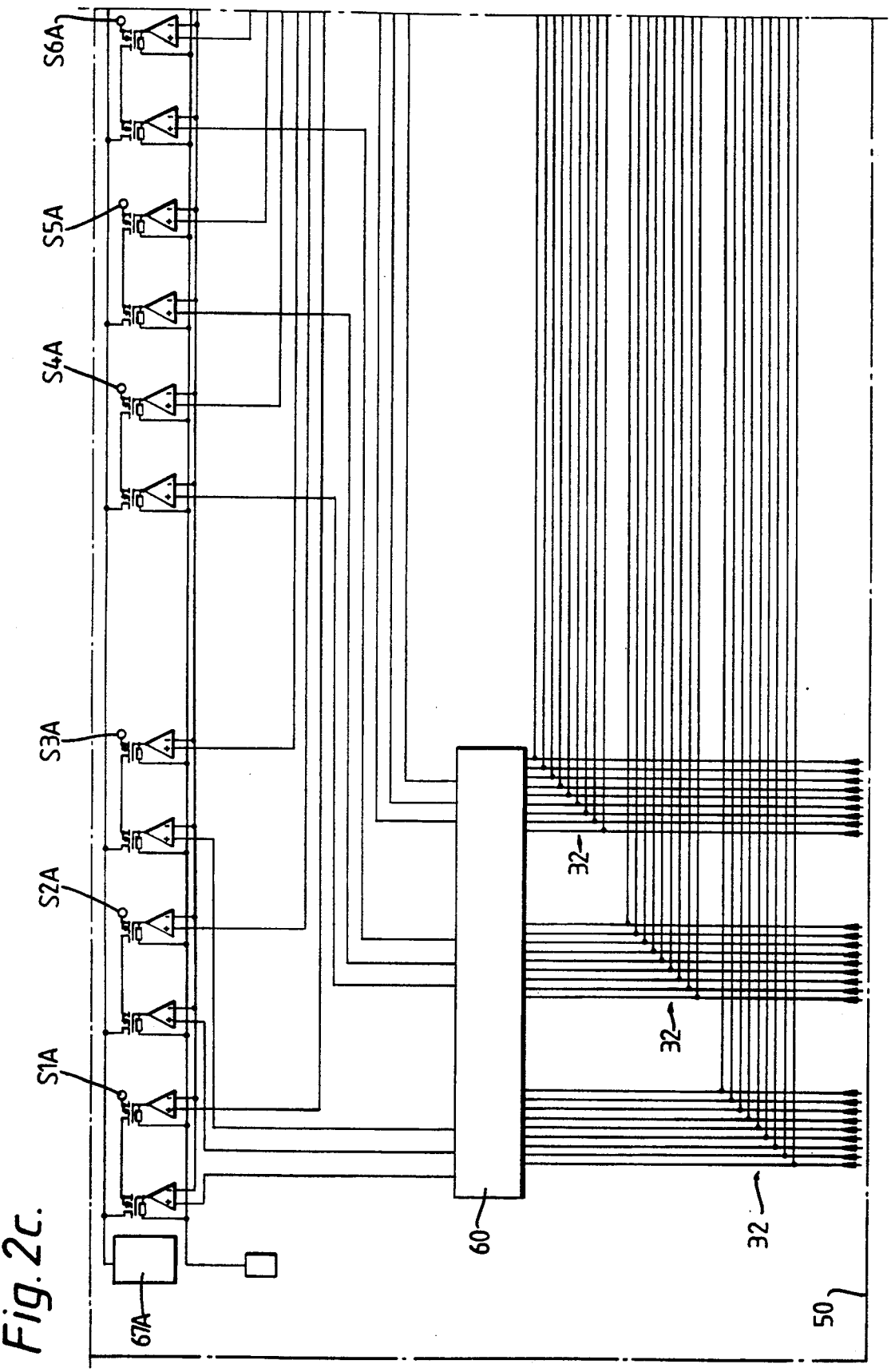
Figure 2D:
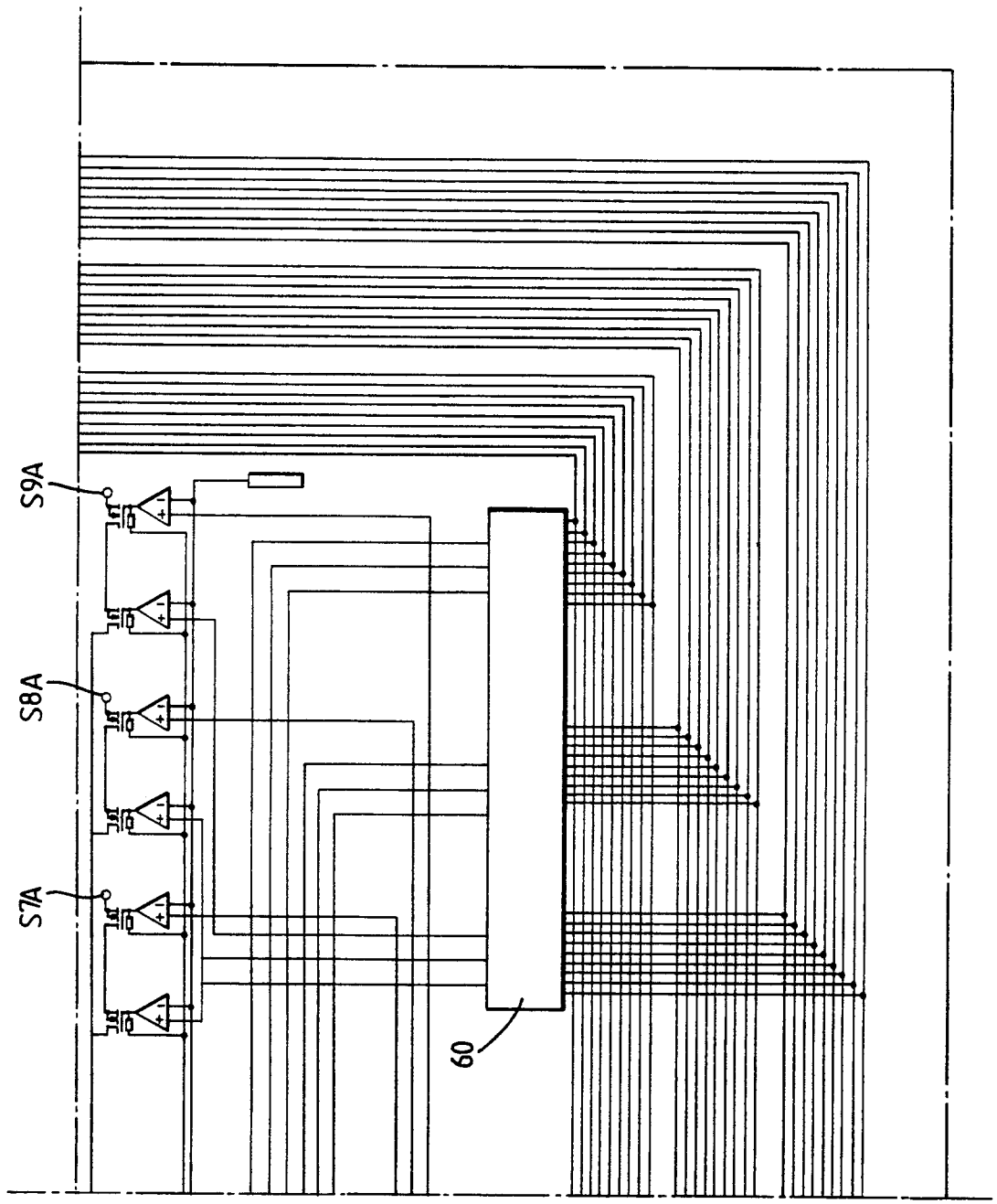

It is certified that error appears in the above-identified patent and that said Letters Patent is hereby corrected as shown below:

Column 1, line 60, delete "FIG. 1 is" and insert —FIGS. 1a and 1b are";

line 63, delete "2d" and insert —2e—; and line 67, delete "2d" and insert —2e—.

Column 2, line 48, delete "2d" and insert —2e—;

line 49, delete "2d" and insert —2e—; and line 59, delete "2d" and insert —2e—.

Signed and Sealed this

Twentieth Day of June, 1995

Attest:

BRUCE LEHMAN

Attesting Officer

Commissioner of Patents and Trademarks